United States Patent [19]
Lee

[11] Patent Number: 5,737,602
[45] Date of Patent: Apr. 7, 1998

[54] IMAGE FORMING APPARATUS USING BAND BUFFERING SYSTEM AND PRINTING METHOD THEREOF

[75] Inventor: In-Soo Lee, Seoul, Rep. of Korea

[73] Assignee: SamSung Electronics Co., Ltd., Suwon, Rep. of Korea

[21] Appl. No.: 557,881

[22] Filed: Nov. 14, 1995

[30] Foreign Application Priority Data

Nov. 17, 1994 [KR] Rep. of Korea ............... 30262/1994

[51] Int. Cl.$^6$ ............................................. G06K 15/00
[52] U.S. Cl. ............................................. 395/105; 395/112
[58] Field of Search ............................... 395/102, 103, 395/112, 111, 105, 115, 116, 827, 834, 836, 849; 358/412, 419, 420, 421, 422, 423, 424, 486

[56] References Cited

U.S. PATENT DOCUMENTS 5,138,561  8/1992  Crowe ........................... 395/103

FOREIGN PATENT DOCUMENTS 23 28 949  1/1975  Germany.

*Primary Examiner*—Arthur G. Evans
*Attorney, Agent, or Firm*—Robert E. Bushnell, Esq.

[57] ABSTRACT

An image forming apparatus using a band buffering system and a printing method thereof prevents band overrun errors from being generated. The image forming apparatus includes: an interface unit for interfacing data transmitted between an external source and the image forming apparatus and a controller. The controller divides the data received by the image forming apparatus through the interface unit into a plurality of band blocks and estimates a conversion time for each one of the plurality of band blocks. The conversion time represents an amount of time required to convert the data corresponding to a respective one of the plurality of band blocks into bit map data. The controller reduces the speed of a motor that feeds paper during a printing operation when the conversion time for any one of the plurality of band blocks exceeds a standard time.

12 Claims, 5 Drawing Sheets

IMAGE FORMING APPARATUS USING BAND BUFFERING SYSTEM AND PRINTING METHOD THEREOF

CROSS-REFERENCE TO RELATED APPLICATIONS

This application makes reference to, incorporates the same herein, and claims all benefits accruing under 35 U.S.C. §119 from an application for *Image Forming Apparatus Using Band Buffering System And Printing Method Therefor* earlier filed in the Korean Industrial Property Office on 17 Nov. 1994 and assigned Ser. No. 30262/1994.

BACKGROUND OF THE INVENTION

The present invention relates to an image forming apparatus using a band buffering system, and more particularly, to an image forming apparatus using a band buffering system and printing method for preventing generation of a band overrun error during printing.

According to conventional printing methods, an image forming apparatus such as a page printer can be categorized as a full page buffering system or a band buffering system. In particular, is the band buffering system using a relatively small memory unit to store band data has been widely used.

With conventional band buffering systems, the speed of a driving motor in an engine unit remains constant and a period of the horizontal synchronous signal HSYNC for receiving the data of the one scan line is also constant. Accordingly, the conventional image forming apparatus using a band buffering system and this printing method can generate a band overrun error which renders a normal printing operation impossible. This typically occurs when the processing time of any one band is more than a standard time corresponding to the speed of the driving motor and the period of the horizontal synchronous signal HSYNC. The present invention is directed towards eliminating band overrun errors.

SUMMARY OF THE INVENTION

Accordingly, it is object of the present invention to provide an improved image forming apparatus and process.

It is another object to provide an image forming apparatus using a band buffering system for preventing a band overrun error from being generated during printing.

It is still another object to provide a printing method for preventing a band overrun error from being generated during printing in an image forming apparatus using the band buffering system.

It is yet another object to provide an image forming apparatus using a band buffering system that prevents band overrun errors from being generated by adjusting the speed of motor that feeds paper during a printing operation.

These and other objects can be achieved according to the principles of the present invention with an image forming apparatus and process using a band buffering system. The image forming apparatus includes an engine unit with a motor for feeding paper during a printing operation and a controller for performing data conversion procedures prior to the printing operation. During the process the controller receives data from an external source and stores the data in a memory. The controller divides the data into a plurality of band blocks and converts the data into symbolic commands, and then estimates a conversion time for each one of the plurality of band blocks. The conversion time represents an amount of time required to convert the symbolic commands corresponding to a respective one of the plurality of band blocks into bit map data. The control means reduces a speed of the motor that feeds the paper during the printing operation when the conversion time for at least one of the plurality of band blocks exceeds a standard time and provides the bit map data to the engine unit in response to receiving data request signals from the engine unit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
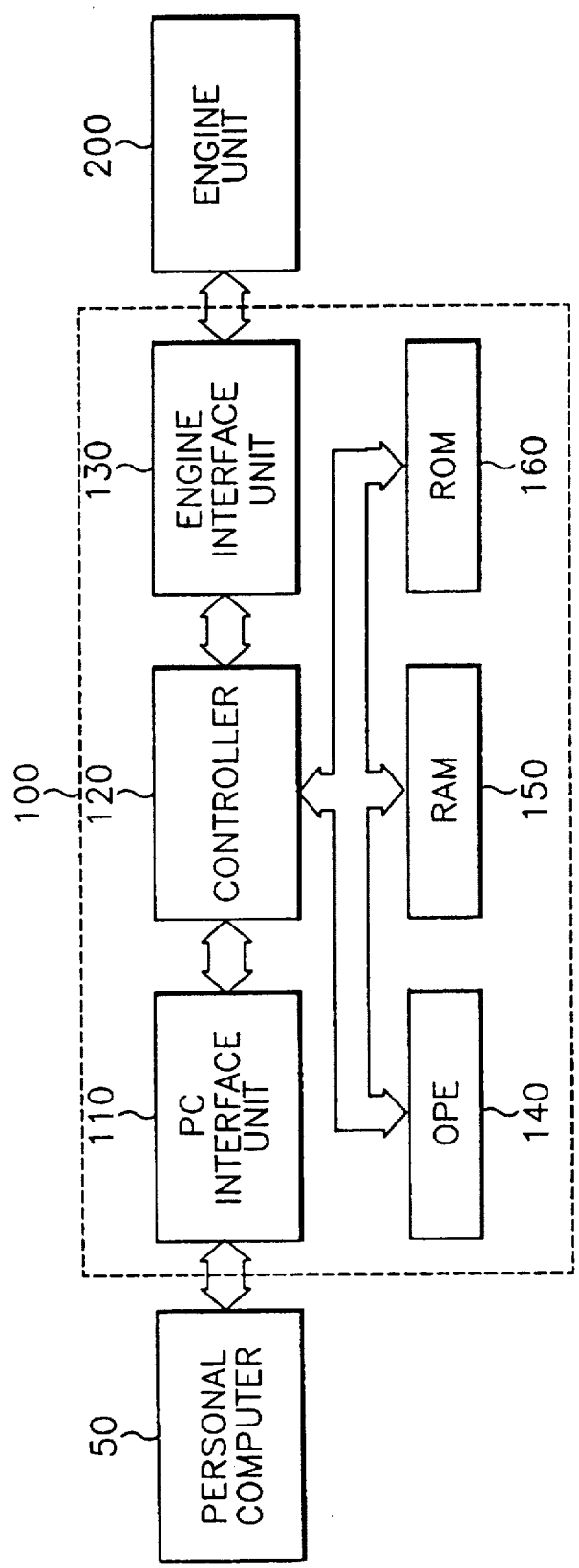
FIG. 1 is a block diagram showing a representative image forming apparatus using the band buffering system and process.

Turning now to the drawings and referring to FIG. 1, a block diagram of a representative image forming apparatus using the band buffering system is shown. The image forming apparatus of FIG. 1 includes a personal computer (PC) 50, a video controller 100 and an engine unit 200.

In FIG. 1, video controller 100 is composed of a personal computer (PC) interface unit 110 which interfaces an input/output signal with personal computer (PC) 50. A controller 120 converts video data input from personal computer (PC) interface unit 110 into bit map data to be printed and controls the general operation of the image forming apparatus. An engine interface unit 130 interfaces the input/output signal with engine unit 200 under the control of controller 120. Operating panel equipment (OPE) 140, which includes a plurality of keys capable of generating key data, outputs the key data to controller 120 when the key data is generated, and displays information in accordance with a control operation of controller 120. A random access memory (RAM) 150 temporarily stores video data input from personal computer (PC) interface unit 110 and other kinds of data generated upon a printing operation performed under the control of controller 120. A read only memory (ROM) 160 stores a control program and source data for a symbolic command conversion process performed by controller 120. Engine unit 200 receives bit map data from video controller 100 and prints the data on a printable medium, such as cut sheets of paper.

Figure 2:
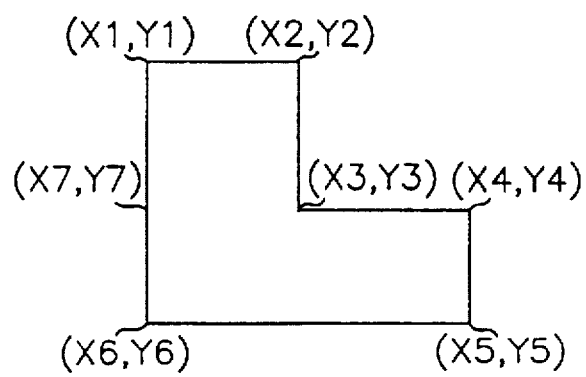
FIG. 2 is a diagram showing coordinates representative of a symbolic command conversion of a character "L"

FIG. 2 is a diagram showing coordinates representative of a symbolic command conversion of a character "L".

Figure 3:
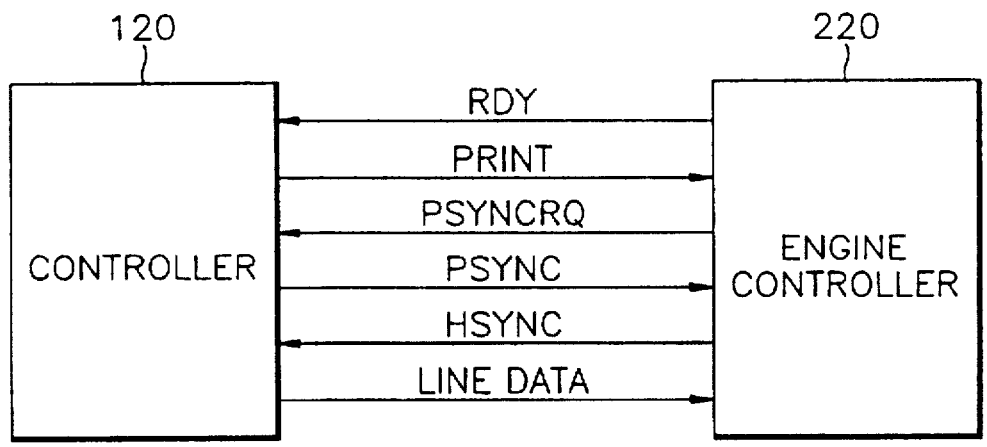
FIG. 3 is a diagram showing a signal transmission relationship between a controller and an engine controller for controlling a general operation of the engine unit in FIG. 1.

FIG. 3 is a diagram showing a signal transmission relationship between controller 120 of video controller 100 and an engine controller 220 (not shown in FIG. 1) for controlling a general operation of engine unit 200 shown in FIG. 1.

An explanation of the conventional image forming apparatus using the band buffering system and the printing method thereof will now be provided with reference to FIGS. 1 through 3.

Controller 120 receives data through personal computer (PC) interface unit 110, divides the received data corresponding to one page into a plurality of individual band blocks for conversion into symbolic commands that are easily convertable into bit map data, and then stores the symbolic commands in random access memory (RAM) 150. According to the operation of another conventional image forming apparatus, controller 120 receives data through personal computer (PC) interface unit 110, divides the received data corresponding to one page into the plurality of individual band blocks, and then directly converts the received data into bit map data.

In the description above, there are various types of received data that are converted into symbolic commands. These types include, for example, the bit map data, font data and line data. As stated above, a diagram of coordinates representative of the symbolic command conversion of a character "L" is shown in FIG. 2. The character "L" is classified as font data and can be converted into the two symbolic commands below:

RET {(X1, Y1), (X2, Y2), (X3, Y3), (X7, Y7)}

RET {(X7, Y7), (X4, Y4), (XS, Y5), (X6, Y6)}

As stated above, when the conversion of received data into symbolic commands is complete, controller 120 converts the symbolic commands into bit map data. Controller 120 then drives engine unit 200 and outputs the bit map data to engine unit 200 through engine interface unit 130. Next, engine unit 200 prints the bit map data on paper.

Referring now to FIG. 3, printing processes after conversion of the symbolic commands into bit map data will now be explained in detail.

First, when engine unit 200 is prepared to operate, engine controller 220 outputs a ready signal RDY to inform controller 120 of this condition. After the ready signal RDY is provided to controller 120, controller 120 provides a print command signal PRINT to engine controller 220. In response to the print command signal PRINT, engine controller 220 drives a motor (not shown), picks up the paper, moves the paper to a position where printing can occur, and provides a page synchronous request signal PSYNCRQ to controller 120. After the page synchronous request signal PSYNCRQ is provided to controller 120, controller 120 outputs a page synchronous signal PSYNC to engine controller 220. At this time, controller 120 transmits line data having the bit map data format corresponding to one scan line to engine controller 220 in synchronism with a horizontal synchronous signal HSYNC which is periodically generated by engine controller 220. Then, after receiving the line data, engine controller 220 enables printing of the data on paper.

Before the actual printing operation, controller 120 reads symbolic commands of a first band from random access memory (RAM) 150 and converts the symbolic commands into bit map data of the first band. When conversion of the bit map data of the first band is complete, controller 120 reads symbolic commands of a second band from random access memory (RAM) 150, and converts these symbolic commands into bit map data of the second band. This process is repeated for each band that makes up the page. Then, after conversion of the bit map data for a final band is complete, the printing operation of the page can be performed.

With the conventional procedure described above, however, during the band buffering process, the speed of a driving motor in engine unit 200 remains constant and a period of the horizontal synchronous signal HSYNC for receiving the data of the one scan line is also constant. Accordingly, the conventional image forming apparatus using a band buffering system and the printing method thereof can generate a band overrun error which renders a normal printing operation impossible. This typically occurs when the processing time of any one band is more than a standard time corresponding to the speed of the driving motor and the period of the horizontal synchronous signal HSYNC.

Figure 4:
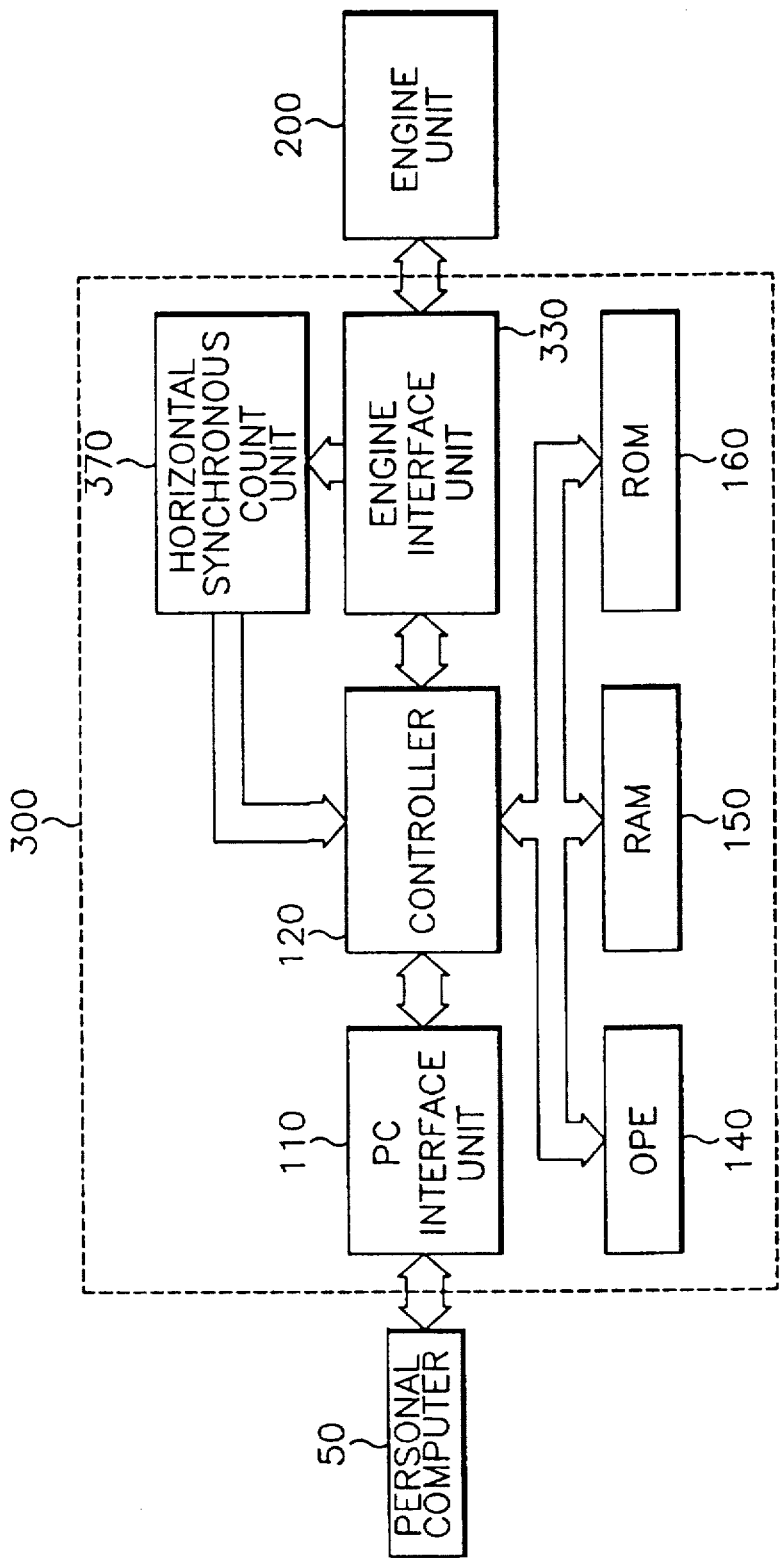
FIG. 4 is a block diagram showing a construction of an image forming apparatus using a band buffering system in accordance with the principles of the present invention.

Referring now to FIG. 4, a block diagram of an image forming apparatus using a band buffering system according to the principles of the present invention is shown. The image forming apparatus of FIG. 4 includes a personal computer (PC) 50, a video controller 300 and an engine unit 200.

In FIG. 4, video controller 300 is composed of a personal computer (PC) interface unit 110 which interfaces an input/output signal with personal computer (PC) 50. A controller 120 converts video data input from personal computer (PC) interface unit 110 into bit map data to be printed and controls the general operation of the image forming apparatus. An engine interface unit 330 interfaces the input/output signal with engine unit 200 under the control of controller 120. Operating panel equipment (OPE) 140, which includes a plurality of keys capable of generating key data, outputs the key data to controller 120 when the key data is generated, and displays information in accordance with a control operation of controller 120. A random access memory (RAM) 150 temporarily stores video data input from personal computer (PC) interface unit 110 and other kinds of data generated during a print operation under the control of controller 120. A read only memory (ROM) 160 stores a control program and source data for symbolic command conversion performed by controller 120. A horizontal synchronous count unit 370 receives and counts inputs of a horizontal synchronous signal HSYNC provided from engine unit 200 through an engine interface unit 330, and outputs the counted value to controller 120.

Figure 5:
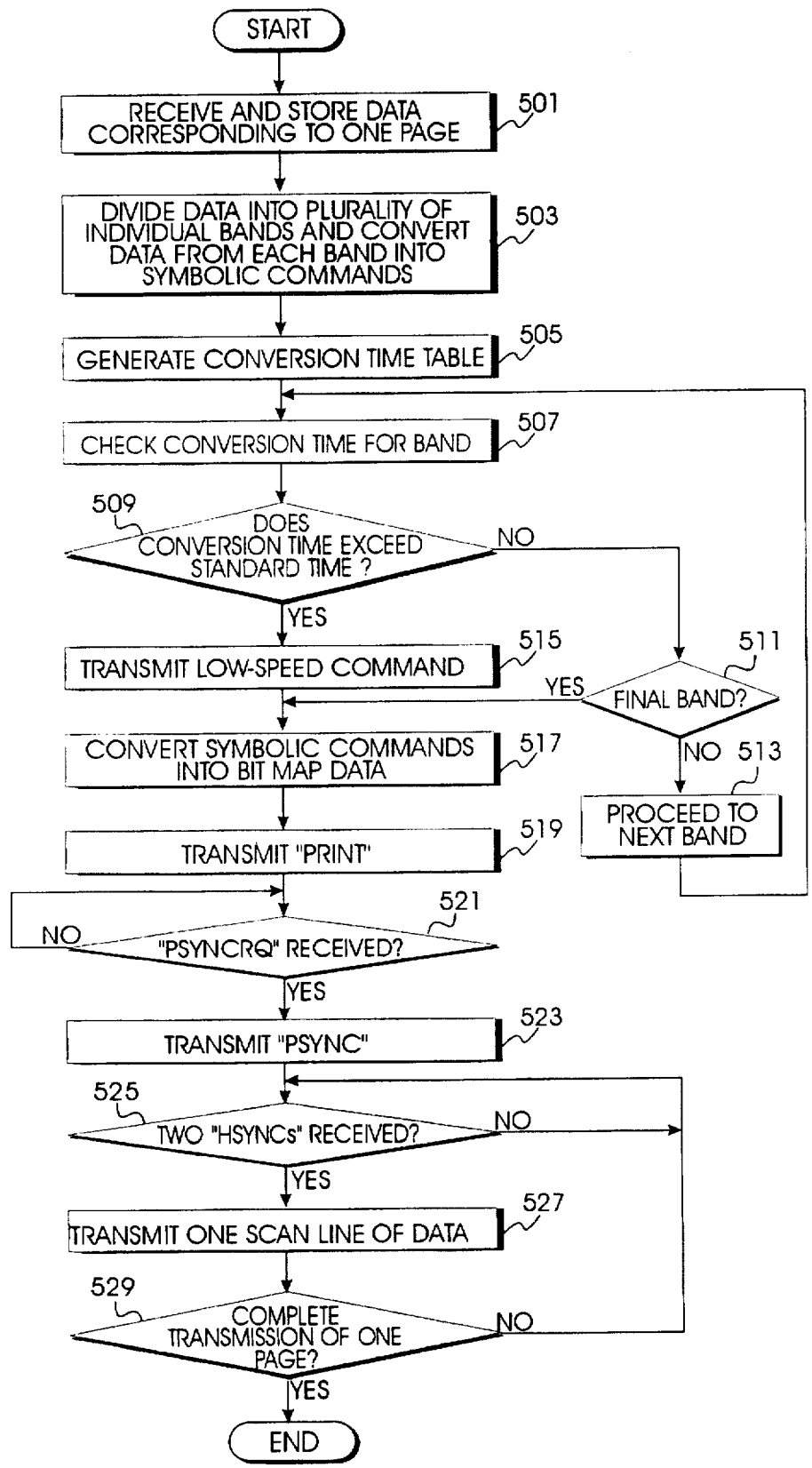
FIG. 5 is a flow chart illustrating the operation of a controller according to the principles of the present invention.

FIG. 5 is a flow chart illustrating the operation of controller 120 constructed according to the principles of the present invention.

Figure 6:
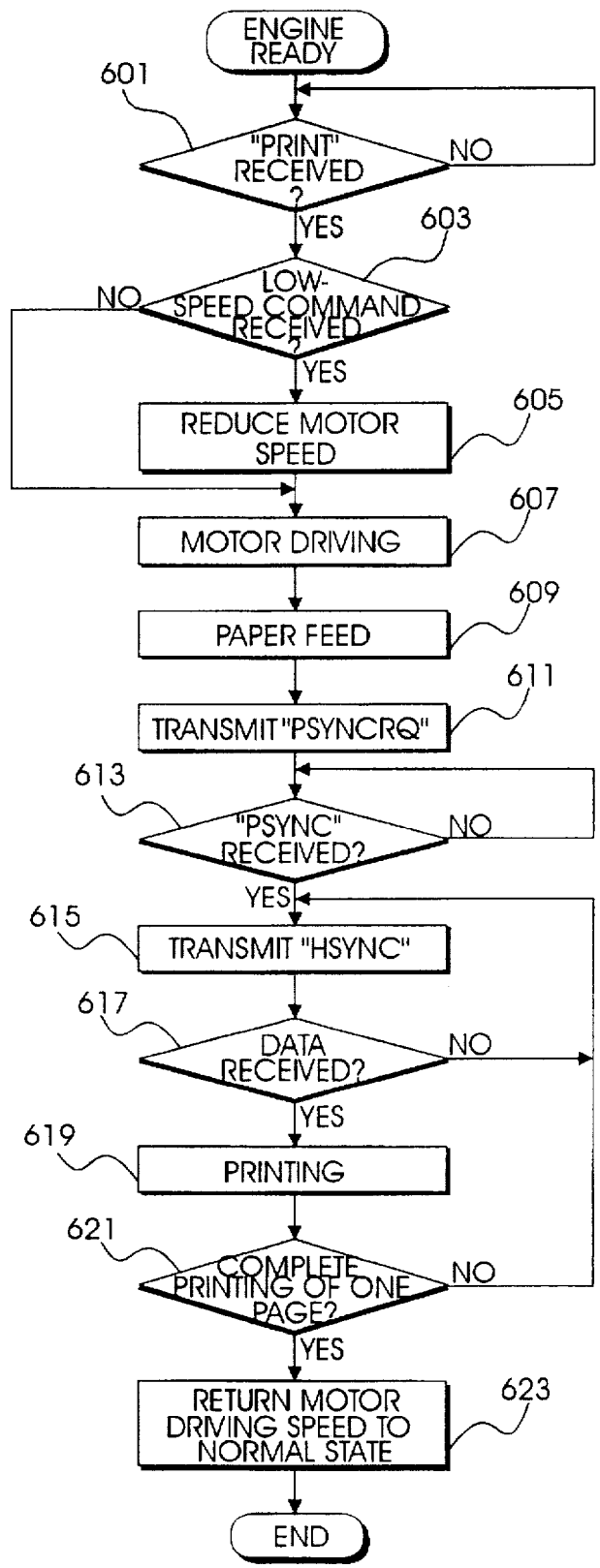
FIG. 6 is a flow chart illustrating the operation of an engine controller according to the principles of the present invention.

FIG. 6 is a flow chart illustrating the operation of engine controller 220 constructed according to the principles of the present invention.

An explanation of a preferred embodiment of the present invention will now be provided with reference to FIGS. 4 through 6.

First, in step 501, controller 120 receives data corresponding to one page through personal computer (PC) interface unit 110 and stores the received data in random access memory (RAM) 150. In step 503, controller 120 divides the received data into a plurality of individual band blocks and converts the received data of each band into symbolic commands. During this process, the received data is converted in accordance with an applicable symbolic command conversion system.

In step 505, controller 120 generates a conversion time table for estimating the amount of time required for converting the symbolic commands of each band into bit map data. The process of generating the conversion time table will now be described in detail.

As mentioned above, there are various types of received data that are converted into symbolic commands, of which bit map data (which is data transmitted from personal computer (PC), for example, a dot), font data, and line data are exemplary thereof. The amount of time required to convert symbolic commands representative of received bit map data into bit map data can be estimated based on the number of bytes that constitute the bit map. The amount of time required to convert a symbolic command representative of received font data into bit map data can be estimated based on the size of the corresponding font. The amount of time required to convert a symbolic command representative of received line data into bit map data can be estimated based on the length of the line.

In step 507, controller 120 reads the conversion time table to sequentially check the respective conversion times for the bands, and determines whether the conversion time for a band currently being checked exceeds a standard time, in step 509. The standard time refers to a constant time that is typically required for printing data corresponding to a single band. The standard time varies depending upon the type of printer.

When it is determined that the conversion time for a band currently being checked exceeds the standard time in step 509, controller 120 transmits a low-speed command to engine controller 220 in step 515. The low-speed command controls the driving of a motor to decelerate the printing operation. In this instance, a conventional data line can be used to transmit the low-speed command.

When it is determined in step 509 that the conversion time for the band currently being checked does not exceed the standard time, controller 120 determines whether the band currently being checked is the final band of the page of data. If the band currently being checked is not the final band, controller 120 proceeds to the next band in step 513, and returns to step 507.

If it is determined in step 511 that the band currently being checked is the final band of the page of data, or the low-speed print command is transmitted in step 515, controller 120 converts the symbolic commands from the bands into bit map data in step 517, and then transmits a print command signal PRINT to engine controller 220 in step 519.

At this time, engine controller 220 of engine unit 220 determines whether the print command signal PRINT was received from controller 120 in step 601 of FIG. 6. When it is determined that the print command signal PRINT was received from controller 120, engine controller 220 then checks, in step 603, whether a low-speed mode is designated through receipt of the low-speed command. When it is determined that the low-speed mode is designated after receiving the low-speed command from controller 120 (i.e., the low-speed command being transmitted to engine controller 220 in step 515 of FIG. 5), engine controller 220 reduces motor speed in step 605 to thereby reduce the speed by which paper is fed. The amount by which motor speed is reduced corresponds to the amount by which the estimated conversion time exceeds the standard time in step 509. That is, if the estimated conversion time exceeds the standard time by a large amount of time, motor speed is greatly reduced by an amount corresponding to the amount of overtime. On the other hand, if the estimated conversion time exceeds the standard time by a small amount of time, motor speed is only slightly reduced.

In a preferred embodiment of the present invention, when the low-speed mode is designated in step 603, motor speed is reduced by half when the motor is driven in step 607. As a result, the speed of the printing operation is reduced by half (i.e., printing time is doubled). However, when the low-speed mode is not designated in step 603, engine controller 220 drives the motor at a normally designated level in step 607. Thereafter, engine unit 200 controls all portions of engine controller 220 by enabling the paper to be fed by the driving of the motor in step 609, and the page synchronous request signal PSYNCRQ to be transmitted to controller 120 in step 611.

In step 521 of FIG. 5, controller 120 checks for receipt of the page synchronous request signal PSYNCRQ from engine controller 220. When the page synchronous request signal PSYNCRQ is received, controller 120 responds by transmitting the page synchronous signal PSYNC to engine controller 220 in step 523.

In step 613 of FIG. 6, engine controller 220 checks for receipt of the page synchronous signal PSYNC from controller 120. When the page synchronous signal PSYNC is received, engine controller 220 responds by transmitting the horizontal synchronous signal HSYNC to controller 120 in step 615. At this time, if data is not received by engine controller 220 in step 617 after transmission of the horizontal synchronous signal HSYNC to controller 120, engine controller 220 transmits another horizontal synchronous signal HSYNC to controller 120 again in step 615.

During this time, horizontal synchronous count unit 370 performs a counting operation and outputs a single count signal every two counts in synchronism with the horizontal synchronous signal HSYNC through engine interface unit 330.

In step 525 of FIG. 5, controller 120 determines whether the count signal was provided from horizontal synchronous counting unit 370 and recognizes when the horizontal synchronous signal HSYNC is twice received from engine controller 220. When the horizontal synchronous signal HSYNC is twice received from engine controller 220, controller 120 transmits one scan line of bit map data stored in random access memory (RAM) 150 to engine controller 220 in step 527. Next, controller 120 determines whether data corresponding to one page has been transmitted to engine controller 220 in step 529. If one page of data has not been transmitted to engine controller 220 in step 529, controller 120 returns to step 525.

When data has been received by engine controller 220 in step 617 of FIG. 6, printing of the received data occurs in step 619. Then, engine controller 220 determines whether data corresponding to one page has been printed in step 621. When data corresponding to one page has not been printed, engine controller 220 returns to step 615. Alternatively, when data corresponding to one page has been printed, engine controller 220 returns the motor driving speed to a normal state in step 623, and finishes the process.

In a preferred embodiment of the present invention, horizontal synchronous counting unit 370 recognizes two inputs of the horizontal synchronous signal HSYNC. However, in another preferred embodiment, the horizontal synchronous counting unit 370 is not provided, as shown in FIG. 1. Thus, upon conversion of a band whose conversion time exceeds the standard time, controller 120 counts inputs of the horizontal synchronous signal HSYNC, so that controller 120 may transmit the bit map data of a previously processed band in correspondence with two horizontal synchronous signals HSYNC.

As stated previously, other modifications and variations to the present invention will be apparent to those skilled in the art without departing from the foregoing disclosure and teachings. Thus, while only certain embodiments of the present invention have been specifically described herein, it will be apparent that numerous modifications may be made thereto without departing from the spirit and scope of the present invention. For example, the following methods can be used as a counting method, other than the conversion time counting method used in the preferred embodiment of the present invention.

EXAMPLE I

Assume that controller 120 obtains the number of dots included in the symbolic commands of a corresponding band, and the obtained number of dots is proportional to a conversion time value. By comparing the obtained number of dots with a given standard value, controller 120 can determine whether the corresponding band will generate a band overrun error, and can also obtain the amount of conversion overtime for the band if it is determined that the band will generate a band overrun error.

EXAMPLE II

Assume that there are various types of symbolic commands and the same symbolic commands have the same conversion times. Controller 120 can designate a conversion time value for each of the various types of symbolic commands of a band, compare a sum of conversion time values for the symbolic commands of the band with a given standard value, determine whether the band will generate a band overrun error, and obtain the amount of conversion overtime for the band if it is determined that the band will generate a band overrun error. Here, the total conversion time for the corresponding band is proportional to the sum of the conversion time values of the various types of symbolic commands.

EXAMPLE III

Assume that all symbolic commands have the same conversion times. Controller 120 can obtain a sum of conversion time values for the symbolic commands in the corresponding band, compare the sum with a given standard value, determine whether the band will generate a band overrun error, and obtain the amount of conversion overtime for the band if it is determined that the band will generate a band overrun error. Here, the total conversion time for the corresponding band is proportional to the total number of symbolic commands in that band.

As mentioned above, the present invention has an advantage of preventing band overrun errors by estimating the amount of time required to convert symbolic commands of a band into bit map data, and reducing the speed of a motor that performs the printing operation when the estimated conversion time for a band exceeds a standard time.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. An image forming apparatus using a band buffering system, comprising:

interface means for interfacing data transmitted between an external source and said image forming apparatus; and control means for dividing said data received by said image forming apparatus from said external source via said interface means into a plurality of band blocks and estimating a conversion time for each one of said plurality of band blocks, said conversion time representative of an amount of time required to convert said data corresponding to a respective one of said plurality of band blocks into bit map data, said control means reducing a speed of a motor that feeds paper during a printing operation when said conversion time for at least one of said plurality of band blocks exceeds a standard time, said control means reducing said speed of said motor by one half.

2. An image forming apparatus using a band buffering system, comprising:

interface means for interfacing data transmitted between an external source and said image forming apparatus; and control means for dividing said data received by said image forming apparatus from said external source via said interface means into a plurality of band blocks and estimating a conversion time for each one of said plurality of band blocks, said conversion time representative of an amount of time required to convert said data corresponding to a respective one of said plurality of band blocks into bit map data, said control means reducing a speed of a motor that feeds paper during a printing operation when said conversion time for at least one of said plurality of band blocks exceeds a standard time, said control means reducing said speed of said motor by an amount corresponding to a time period that said conversion time for said one of said plurality of band blocks exceeds said standard time.

3. An image forming apparatus using a band buffering system, comprising:

engine means for performing a printing operation after generating data request signals, said engine means comprising a motor for feeding paper during said printing operation;

data storing means for storing data; and control means for receiving said data from an external source and storing said data in said storing means, said control means dividing said data into a plurality of band block and converting said data into symbolic commands, and then estimating a conversion time for each one of said plurality of band blocks, said conversion time representative of an amount of time required to convert said symbolic commands corresponding to a respective one of said plurality of band blocks into bit map data, said control means reducing a speed of said motor that feeds the paper during said printing operation when said conversion time for at least one of said plurality of band blocks exceeds a standard time and providing said bit map data to said engine means in response to reception of said data request signals, said control means reducing said speed of said motor by one half.

4. An image forming apparatus using a band buffering system, comprising:

engine means for performing a printing operation after generating data request signals, said engine means comprising a motor for feeding paper during said printing operation;

data storing means for storing data; and control means for receiving said data from an external source and storing said data in said storing means, said control means dividing said data into a plurality of band block and converting said data into symbolic commands, and then estimating a conversion time for each one of said plurality of band blocks, said conversion time representative of an amount of time required to convert said symbolic commands corresponding to a respective one of said plurality of band blocks into bit map data, said control means reducing a speed of said motor that feeds the paper during said printing operation when said conversion time for at least one of said plurality of band blocks exceeds a standard time and providing said bit map data to said engine means in response to reception of said data request signals, said control means reducing said speed of said motor by an amount corresponding to a time period that said conversion time for said one of said plurality of band blocks exceeds said standard time.

5. A printing method for an image forming apparatus using a band buffering system, said method comprising the steps of:

receiving data corresponding to one printed page from an external source; dividing said data corresponding to said one printed page into a plurality of band block and converting said data corresponding to said plurality of band blocks into symbolic commands;

estimating a conversion time for each one of said plurality of band blocks, said conversion time being representative of an amount of time required to convert said symbolic commands corresponding to a respective one of said plurality of band blocks into bit map data; and reducing a speed of a motor that feeds paper during a printing operation when said conversion time for at least one of said plurality of band blocks exceeds a standard time, said speed of said motor being reduced by an amount corresponding to a time period that said conversion time for said one of said plurality of band blocks exceeds said standard time.

6. A printing method for an image forming apparatus using a band buffering system, said method comprising the steps of:

receiving data corresponding to one printed page from an external source;

dividing said data corresponding to said one printed page into a plurality of band block and converting said data corresponding to said plurality of band blocks into symbolic commands;

estimating a conversion time for each one of said plurality of band blocks, said conversion time being representative of an amount of time required to convert said symbolic commands corresponding to a respective one of said plurality of band blocks into bit map data; and reducing a speed of a motor that feeds paper during a printing operation when said conversion time for at least one of said plurality of band blocks exceeds a standard time, said speed of said motor being reduced by one half.

7. The printing method as claimed in claim 5, wherein said estimating step further comprises a step of obtaining a number of dots included in said symbolic commands corresponding to said respective one of said plurality of band blocks, said conversion time for said respective one of said plurality of band blocks being proportional to said number of dots.

8. The printing method as claimed in claim 6, wherein said estimating step further comprises a step of obtaining a number of dots included in said symbolic commands corresponding to said respective one of said plurality of band blocks, said conversion time for said respective one of said plurality of band blocks being proportional to said number of dots.

9. The printing method as claimed in claim 5, wherein said estimating step further comprises a step of obtaining a number of said symbolic commands included in said respective one of said plurality of band blocks, said conversion time for said respective one of said plurality of band blocks being proportional to said number of said symbolic commands.

10. The printing method as claimed in claim 6, wherein said estimating step further comprises a step of obtaining a number of said symbolic commands included in said respective one of said plurality of band blocks, said conversion time for said respective one of said plurality of band blocks being proportional to said number of said symbolic commands.

11. The printing method as claimed in claim 5, wherein said estimating step further comprises a step of obtaining conversion times respectively corresponding to various types of said symbolic commands included in said respective one of said plurality of band blocks, said conversion time for said respective one of said plurality of band blocks being proportional to a sum of said conversion times.

12. The printing method as claimed in claim 6, wherein said estimating step further comprises a step of obtaining conversion times respectively corresponding to various types of said symbolic commands included in said respective one of said plurality of band blocks, said conversion time for said respective one of said plurality of band blocks being proportional to a sum of said conversion times.

\* \* \* \* \*